United States Patent Office 2,874,119
Patented Feb. 17, 1959

2,874,119
CORROSION INHIBITING COMPOSITIONS

Richard C. Mansfield, Haddonfield, N. J., John G. Morrison, Philadelphia, Pa., and Claude J. Schmidle, Moorestown, N. J., assignors to Rohm & Haas Company, Philadelphia, Pa., a corporation of Delaware No Drawing. Application May 21, 1956
Serial No. 585,942

7 Claims. (Cl. 252—8.55)

This invention relates to corrosion inhibiting compositions for use as hydrochloric acid baths in contact with iron or steel. This invention deals with corrosion inhibited hydrochloric acid baths for use in removing scale deposits from iron or steel surfaces and for use in acidizing wells, these baths comprising aqueous hydrochloric acid solutions having dissolved therein as an inhibitor the acid-catalyzed basic condensation product of a styrene, formaldehyde, and ammonia or methylamine.

Scale deposits such as those comprising the various iron oxides or alkaline earth carbonates are commonly removed by treatment with an aqueous solution of an acid. Since the acid also attacks and dissolves some of the metal underlying the deposits to be removed, a corrosion inhibitor is desirably added to reduce the rate of attack of the acid upon the metal. Among the substances known to reduce the corrosion of the metal by hydrochloric acid are coal tar bases and derivatives of abietyl-, hydroabietyl-, and dehydroabietylamines. For some applications, these substances do not reduce the corrosiveness of hydrochloric acid solutions to the desired extent particularly at elevated temperatures or in instances where the metal is in contact with the acid solution for an extended period of time. In addition, the more efficient commercially available inhibitors tend to foam badly either because of their inherent surface activity or because of the addition of surface active agents to solubilize the inhibitor in the acid solution. This foaming tendency is particularly troublesome in the presence of carbonate deposits because of the evolution of carbon dioxide.

It is an object of this invention to provide potent corrosion inhibitors which are soluble in hydrochloric acid. It is also an object to provide a composition of matter comprising a hydrochloric acid solution containing dissolved therein in minor proportion, but in amount sufficient to inhibit corrosion of the metal surfaces by said hydrochloric acid solution, an organic nitrogen base obtained from the reaction under the influence of hydrochloric acid as catalyst of ammonia or methylamine with formaldehyde and an olefin of the general formula

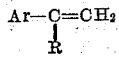

where Ar is phenyl, tolyl, or xylyl, and R is hydrogen or a methyl group. Ammonia and methylamine are best used in the form of their hydrochlorides, reactant and catalyst thus being both supplied in one convenient substance.

The reaction of ammonium chloride or methylamine hydrochloride with formaldehyde and olefins is described in United States Patent 2,647,117 and the process there described is applicable to the above noted styrenes. Since the product which results from this process is complex, it is best described in terms of how it is made. Hence, details of the process follow.

Formaldehyde may be used in the form of aqueous solutions, of solutions in alcohol, conveniently in methanol, where it may exist in the form of a hemiformal, or of a revertible polymer. Usually formaldehyde is used in excess based on molar proportions referred to the olefin, proportions from about 1.5:1 to 5:1 being practical. With less than a 2:1 proportion, unreacted starting materials may be present in the reaction mixture. Preferred proportions are from 2:1 to 4:1.

The ammonia or methylamine may be supplied as a gas or as an aqueous solution or in the form of the hydrochloride salt. If ammonia, methylamine, or ammonium hydroxide is used, it will react with the hydrochloric acid which is added as catalyst. The same final result is obtained by use of the preformed ammonium chloride or methylamine hydrochloride. The amount of ammonium compound or methylamine compound is usually at least equivalent to the olefin and may be in considerable excess. The preferred ratios of ammonia or methylamine to olefin are from 1.0:1 to 2.5:1.

If ammonia or methylamine are not used in the form of their hydrochloride salts, hydrochloric acid or hydrogen chloride is added at any convenient stage. The amount thereof supplied is usually best about equivalent to the ammonia or methylamine, but smaller or larger amounts may be used.

The order in which the olefin, formaldehyde, catalyst, and ammonia or methylamine are mixed is immaterial. Formaldehyde and ammonia or methylamine or their hydrochloride salts may first be mixed, even though there may be interaction, and the olefin added to this mixture or the mixture to the olefin. Other orders of mixing are likewise effective.

The reaction mixture is heated between 45° and about 120° C. until good conversion is obtained. The reaction is usually exothermic and sometimes it may be desirable to limit the rate of addition of reactants and/or supply cooling. Usually in one-half to four hours reaction is essentially complete. The reaction mixture may, if desired, be heated for a longer time, particularly when styrene itself is employed as the olefin.

The resulting solution containing the hydrochloride salt of the corrosion inhibitor may be employed as such. Acid-insoluble by-products may be removed by extraction of the reaction mixture with a suitable organic solvent or by steam distillation. If desired, the free organic base may be isolated by making the reaction mixture strongly basic with sodium hydroxide, ammonia, lime, methylamine, or other suitable basic materials and separating the water-insoluble material which results. It contains various organic nitrogen bases.

The resulting organic nitrogen bases or their hydrochloride salts are readily soluble in hydrochloric acid to give solutions which exhibit no foaming tendencies in the presence of evolved hydrogen or carbon dioxide or upon agitation and which provide good inhibition of attack of iron and steel by hydrochloric acid.

The aminomethylated styrene reaction products which are prepared by the reaction and method described above may vary somewhat in the particular chemical substances and their proportions in these reaction products. Variations arise with choice of olefin, choice of ammonia or methylamine, and conditions of reaction, including time and temperature. Even though there may be variations from these factors, the various acid-catalyzed reaction products from a styrene, ammonia or methylamine, and formaldehyde all exhibit corrosion inhibiting action.

Also, the reaction products may be used for inhibiting hydrochloric acid in the reaction medium in which they are formed, even though by-products, such as $ArCOCH_3$ or $ArC(R)(OH)CH_3$ and small amounts of unconverted starting materials may be present. These have no evident effect on corrosion. Alternatively, free starting olefin and such by-products may be removed by extracting the reaction mixture as obtained. Again, the basic reaction products can be obtained as an oil by rendering the reaction mixture alkaline as already mentioned, the oil then being added to a hydrochloric acid solution. Again, if desired, there may be removal of inert by-products and starting materials followed by the separation and isolation of the basic nitrogenous reaction products. The products which are obtained as an oil are readily dissolved in hydrochloric acid, forming salts therewith.

Details of preparation of typical nitrogen bases and their use as inhibitors are presented in the following illustrative examples. Parts are by weight unless otherwise noted.

EXAMPLE 1

A mixture of 60 parts of ammonium chloride, 255 parts of aqueous 37% formaldehyde, and 118 parts of α-methylstyrene was stirred and heated to 50° C. The exothermic reaction which took place caused the temperature to rise to 70° C. and cooling was necessary to maintain the temperature at 68°–70° C. After one-half hour a homogeneous mixture resulted which contained 40% of amino-methylated α-methylstyrene reaction products.

A cleaned and polished 1″ x 2″ x ⅛″ specimen of S. A. E. 1010 steel immersed in 100 ml. of 10% hydrochloric acid containing 0.40 gram of the aminomethylated α-methylstyrene reaction products (i. e. one gram of the entire reaction mixture), prepared as described above, was heated at 175° F. for six hours. At the end of this time, the weight loss corresponded to a corrosion rate of 0.0055 pound/square foot/day. At 200° F., the corrosion rate was 0.0189 pound/square foot/day. The acid solution containing the inhibitor was non-foaming.

EXAMPLE 2

A mixture of 25 parts of 25% aqueous methylamine, 70 parts of methylamine hydrochloride, 200 parts of 37% aqueous formaldehyde, and 118 parts of α-methylstyrene was stirred at 65°–70° C. for two hours. The resulting clear solution was extracted with benzene and then made basic with concentrated ammonium hydroxide. The basic nitrogen compound separated as an oil phase which was taken up with benzene and washed with water. The benzene was removed by distillation under reduced pressure to leave a residue of 164 parts of methylaminomethylated α-methylstyrene reaction products.

A cleaned and polished 1″ x 2″ x ⅛″ specimen of S. A. E. 1010 steel immersed in 100 ml. of 10% hydrochloric acid containing 0.40 gram of the methylaminomethylated α-methylstyrene reaction products, prepared as described above, was heated at 175° F. for six hours. At the end of this time, the weight loss corresponded to a corrosion rate of 0.0038 pound/square foot/day.

EXAMPLE 3

A mixture of 118 parts of vinyltoluene, 60 parts of ammonium chloride, and 255 parts of 37% aqueous formaldehyde was stirred and heated at 92°–95° C. for seven hours, extracted with benzene, and made basic with excess concentrated ammonium hydroxide. The basic nitrogen compounds which separated were taken up with benzene and dried over anhydrous potassium carbonate. The benzene was removed by distillation at reduced pressure. There were obtained, as a residue, 123 parts of aminomethylated vinyltoluene reaction products being a viscous amber liquid having a refractive index at 25° C. of 1.5553.

A cleaned and polished 1″ x 2″ x ⅛″ specimen of S. A. E. 1010 steel immersed in 100 ml. of 10% hydrochloric acid containing 0.40 gram of the aminomethylated vinyltoluene reaction products, prepared as described above, was heated at 175° F. for six hours. At the end of this time, the weight loss corresponded to a corrosion rate of 0.0073 pound/square foot/day.

In place of α-methylstyrene or vinyltoluene as specifically shown in the above examples there may be used styrene, vinylxylene, p,α-dimethylstyrene, isopropenylxylene, or other compound of the formula $ArC(R)=CH_2$. Either ammonia or methylamine can be used with any of these vinylidene aromatic compounds. In every case the reaction products are good corrosion inhibitors for hydrochloric acid. The process for forming the reaction products follows the above descriptions.

By way of summarizing numerous data there are presented in Table I results of corrosion tests made with typical reaction products from the following reactants:

A. Methylamine hydrochloride, formaldehyde, vinyltoluene.
B. Methylamine hydrochloride, formaldehyde, p,α-dimethylstyrene.
C. Ammonium chloride, formaldehyde, p,α-dimethylstyrene.
D. Ammonium chloride, formaldehyde, styrene.
E. Methylamine hydrochloride, formaldehyde, styrene.

Five cleaned and polished 1″ x 2″ x ⅛″ specimens of S. A. E. 1010 steel were each immersed in 100 ml. of 10% hydrochloric acid and containing 0.40 gram of one of the above inhibitors, lettered A–E. They were heated at 175° F. for six hours. At the end of this time, the weight losses were determined. These corresponded to corrosion rates for each sample as tabulated in Table I.

*Table I*

| Inhibitor: | Corrosion rate (lbs./sq. ft./day) |
|---|---|
| A | 0.0107 |
| B | 0.0105 |
| C | 0.0089 |
| D | 0.0060 |
| E | 0.0135 |

Using the same test conditions, a commercially available coal tar base inhibitor was used in 10% hydrochloric acid at 0.5% and this mixture had a corrosion rate of 0.0422 pound/square foot/day. A solution of 10% hydrochloric acid containing 0.5% of a commercially available product which is a mixture of 15% of a primary dehydrogenated rosin amine and 85% of a polyethylene glycol ether of an N-monoethanol rosin amine gave a corrosion rate of 0.0131 pound/square foot/day. At 200° F. the corrosion rate with the latter inhibitor was 0.0301 pound/square foot/day. This latter inhibitor exhibited a strong foaming tendency in hydrochloric acid because of its inherent surface activity.

Reaction products of one of the styrenes, formaldehyde, and ammonia or methylamine formed under the influence of hydrochloric acid as catalyst can be added to hydrochloric acid solutions of all concentrations with advantageous results. Thus, the solution may contain 0.01% to about 40% of hydrogen chloride.

The amount of reaction products to be added may be varied over a wide range. In any case an amount is used which is sufficient to inhibit corrosion of ferrous metal surfaces. This amount usually varies from about 0.05% to 10% of the reaction products referred to the weight of the hydrochloric acid in the solution. The preferred proportion of reaction products is from about 0.5% to 5% by the weight of the basic nitrogen reaction products referred to the weight of hydrogen chloride in the inhibited hydrochloric acid solution.

The reaction products are effective over a wide range of temperatures from the temperatures at which the hydrochloric acid solution freezes to its boiling point. Tests at room temperature require such a long time for showing measurable effects that resort has been to elevated temperatures to accelerate measurable corrosion. Yet, semi-quantitative tests have been made by placing a loop of steel or iron wire in hydrochloric acid solutions of various strengths and observing the state of the wire after weeks or months. Uninhibited acid consumes the wire within about an hour. The same solutions of acid to which has been added about 0.1% and upwards of any of the above reaction products fail to consume the wire in a matter of many days and with enough of one of the reaction products a matter of months at room temperature.

We claim:

1. A corrosion inhibited aqueous composition comprising an aqueous hydrochloric acid solution containing dissolved therein, in an amount sufficient to inhibit corrosion of ferrous metal surfaces, the reaction product obtained upon heating, for at least one-half hour at a temperature of 45°–120° C., an ammonium halide of the formula $RNH_3Cl$, where R is a member of the class consisting of hydrogen and the methyl group, with formaldehyde and an olefin of the formula

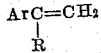

where Ar is a member of the class consisting of phenyl tolyl, and xylyl groups, and R is a member of the class consisting of hydrogen and the methyl group, there being for each part of the olefin employed in the reaction from 1.5 to 5 parts of formaldehyde and from 1.0 to 2.5 parts of the ammonium compound.

2. A corrosion inhibited composition comprising an aqueous solution containing hydrogen chloride and the reaction products obtained upon heating for at least one-half hour at a temperature of from 45°–120° C., 1.5 to 5 parts of formaldehyde, 1.0 to 2.5 parts of an ammonium halide of the formula $RNH_3Cl$, where R is a member of the class consisting of hydrogen and the methyl group, and 1.0 part of an olefinic compound of the structure

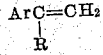

where Ar is a member of the class consisting of phenyl tolyl, and xylyl groups, and R is a member of the class consisting of hydrogen and the methyl group, the said reaction products being present in said solution in a corrosion inhibiting proportion from about 0.05% to 10% of the weight of the hydrogen chloride in said aqueous solution.

3. A corrosion inhibited composition comprising an aqueous solution containing hydrogen chloride and the reaction products obtained upon heating, for at least one-half hour at a temperature of 45°–120° C., 1.0 part of α-methylstyrene, 1.5 to 5 parts of formaldehyde, and 1.0 to 2.5 parts of ammonium chloride, said reaction products being present in said solution in a corrosion inhibiting proportion between about 0.05% to 10% of the weight of the hydrogen chloride in said aqueous solution.

4. A corrosion inhibited composition comprising an aqueous solution containing hydrogen chloride and the reaction products obtained upon heating, for at least one-half hour at a temperature of 45°–120° C., 1.0 part of α-methylstyrene, 1.5 to 5 parts of formaldehyde, and 1.0 to 2.5 parts of methylamine hydrochloride, said reaction products being present in said solution in a corrosion inhibiting proportion between about 0.05% to 10% of the weight of the hydrogen chloride in said aqueous solution.

5. A corrosion inhibited composition comprising an aqueous solution containing hydrogen chloride and the reaction products obtained upon heating, for at least one-half hour at a temperature of 45°–120° C., 1.0 part of vinyltoluene, 1.5 to 5 parts formaldehyde, and 1.0 to 2.5 parts of ammonium chloride, said reaction products being present in said solution in a corrosion inhibiting proportion between about 0.05% to 10% of the weight of the hydrogen chloride in said aqueous solution.

6. A corrosion inhibited composition comprising an aqueous solution containing hydrogen chloride and the reaction products obtained by heating, for at least one-half hour at a temperature of 45°–120° C., 1.0 part of vinyltoluene, 1.5 to 5 parts of formaldehyde, and 1.0 to 2.5 parts of methylamine hydrochloride, said reaction products being present in said solution in a corrosion inhibiting proportion between about 0.05% to 10% of the weight of the hydrogen chloride in said aqueous solution.

7. A corrosion inhibited composition comprising an aqueous solution containing hydrogen chloride and the reaction products obtained by heating, for at least one-half hour at a temperature of 45°–120° C., 1.0 part of p, α-dimethylstyrene, 1.5 to 5 parts of formaldehyde, and 1.0 to 2.5 parts of ammonium chloride, said reaction products being present in said solution in a corrosion inhibiting proportion between about 0.05% to 10% of the weight of the hydrogen chloride in said aqueous solution.

References Cited in the file of this patent

UNITED STATES PATENTS

| | | |
|---|---|---|
| 1,719,649 | Chamberlain | July 2, 1929 |
| 2,564,753 | Cox | Aug. 21, 1951 |
| 2,564,757 | Glasebrook | Aug. 21, 1951 |
| 2,564,758 | Haggard | Aug. 21, 1951 |
| 2,564,759 | Haggard | Aug. 21, 1951 |
| 2,647,117 | Hartough et al. | July 28, 1953 |
| 2,686,776 | Klem | July 17, 1954 |
| 2,758,970 | Saukaitis et al. | Aug. 14, 1956 |
| 2,778,826 | Schmidle | Jan. 22, 1957 |